(12) United States Patent
Pawlak, III (10) Patent No.: US 6,273,811 B1
(45) Date of Patent: Aug. 14, 2001

(54) DUAL FILM BELT VEHICLE AIR CONDITIONING SYSTEM

(75) Inventor: John Lawrence Pawlak, III, Orchard Park, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/488,861

(22) Filed: Jan. 21, 2000

(51) Int. Cl.$^7$ .................................................. B60H 3/00
(52) U.S. Cl. .............................................. 454/156; 165/42
(58) Field of Search .................................... 454/121, 126, 454/156, 160; 251/401; 165/42, 43, 103

(56) References Cited

U.S. PATENT DOCUMENTS

| 5,653,630 | 8/1997 | Higashihara | 454/121 |
| 5,881,558 | 3/1999 | Kawahara et al. | 62/408 |
| 6,045,444 | * 4/2000 | Zima et al. | 454/156 X |

FOREIGN PATENT DOCUMENTS 5-141763 * 6/1993 (JP) ....................................... 454/126

* cited by examiner

Primary Examiner—Harold Joyce
(74) Attorney, Agent, or Firm—Patrick M. Griffin (57) ABSTRACT

A vehicle heating, air conditioning and ventilation system comprises a housing (10) within which an evaporator (12) and heater (14) are arranged generally in a diverging V shape enclosing a mixing space (M) between. All forced air passes through the evaporator (12) first, after which it is can go straight through to the mixing space (M), or be diverted down under the heater (14) to flow through the heater (14) and into the mixing space (M), or some combination of the two. The combination of cold and hot flows into the mixing space (M) is determined by a solid dividing wall (30), which partially blocks the evaporator (12) and heater (14) from one another, and a pair of separate rolling film belts (32, 34), one between the evaporator (12) and the dividing wall upstream side (36) and the other located between the dividing wall downstream side (38) and the heater (14). Each belt (32, 34) has respective windows (48, 56) and solid areas (50, 58) which can be shifted to selectively block or unblock flow into the mixing space (M). The two belts (32, 34) in conjunction with the solid dividing wall (30), prevent any air that has passed through the evaporator (12) from by passing the heater (14). In addition, the individuality of the two belts (32, 34) allows a wide combination of temperatures and air flows to be achieved, and also allows the respective windows (48, 56) to be staggered to promote mixing.

3 Claims, 8 Drawing Sheets

DUAL FILM BELT VEHICLE AIR CONDITIONING SYSTEM

TECHNICAL FIELD

This invention relates to air conditioning systems in general, and specifically to dual film belt temperature control system with improved temperature and air flow control.

BACKGROUND OF THE INVENTION

Vehicle air conditioning systems (broadly defined to include both heating and cooling the air) are often referred to by the shorthand acronym of "HVAC" system. The heart of such a system is a box shaped housing containing an evaporator and heater, which are spaced apart, with inner faces that face one another and outer faces that face away from one another. Fan forced air flow is selectively directed through the two heat exchangers, cold and hot, to attain a final, mixed air stream of a desired temperature and flow rate. In essentially all commercially available systems, the evaporator is located upstream of the heater, and is the physically larger of the two heat exchangers, so that all of the forced air stream passes through it initially. However, the evaporator can be deliberately turned off, so the fact that all air passes through it all the time does not jeopardize the ability to control final temperature. The heater, however, typically operates all the time, so that the system must be able to route or block air selectively through the heater, in order to achieve a desired final, mixed temperature. Older mechanisms for blocking or unblocking the air flow through the heater used a swinging flapper door located in the space between the evaporator and heater, which would admit more or less air through the heater depending on its angular position. The final temperature, mixed air stream would finishes downstream of the beater. Such systems obviously require enough space between the evaporator and heater for the door to swing, limiting how compact the entire system can be made. In addition, swinging door systems tend to lack linearity. That is, they tend to be all on, or all off, but are far less adept at attaining. mid range settings.

More recent designs, attempting to attain both improved packaging and better linearity, have incorporated a rolling film belt to selectively block or unblock air flow through the heater. An example may be seen in U.S. Pat. No. 5,653,630. The design disclosed there uses a single belt (temperature belt) wrapping around the entire inner face of the heater, and which also extends up beyond the heater inner face and partially over, but only partially over, the inner face of the evaporator. The portion of the inner face of 10 the larger evaporator not covered by the single film temperature belt is selectively blocked or unblocked by a swinging door of conventional design. Air that has passed the evaporator is let through, or by passed around, the heater by a combined action of the moving belt and the swinging door, to mix together downstream of the heater. An entirely separate belt (mode belt) moves independently to admit the mixed, final temperature air into the passenger compartment.

The single belt temperature control disclosed, and any single belt design, suffers from an inevitable shortcoming, however. A single belt, as it moves, inherently shifts solid areas to locations where open areas of the belt previously were, and vice versa. Open and blocked areas are not independently achievable, in other words, which means that not every desired combination of final temperature and air flow rate can achieved. A temperature change created by allowing more or less air through the heater core inevitably affects total final air flow rate, as well. The extra by pass door in the design disclosed in U.S. Pat. No. 5,653,630 noted above which needs its own actuator and swinging room which negates much of the advantage of using a film belt in the first instance.

SUMMARY OF THE INVENTION

A vehicle air conditioning system in accordance with the present invention is characterized by the features specified in claim 1.

In the embodiment disclosed, a box shaped system housing contains a conventionally sized evaporator and heater, the evaporator being the larger of the two and located upstream of the heater. The evaporator and heater are preferably arranged in a V shape, with opposed inner faces diverging upwardly from opposed lower edges toward conventional vehicle interior air outlets, creating an air mixing space between the two heat exchangers and below the air outlets. An air flow diversion passage extends from the lower edge of the heater's inner face down and around to its outer face, so that forced air can be routed in a reverse flow through the heater and into the mixing space. Air flow into the diversion passage is assisted by a dividing wall that extends up from the heater lower edge and partially into the mixing space, blocking a portion of the inner faces of the evaporator and heater from one another.

The dividing wall cooperates with a pair of separate film belts to provide improved handling, sealing and mixing of the flow through the two heat exchangers. A first rolling film belt is located between the inner face of the evaporator and the upstream side of the dividing wall. The first film belt extends from a lower roller across the remainder of the inner face of the evaporator to an upper roller. A second rolling film belt is located between the inner face of the heater and the downstream side of the dividing wall. The second belt, oriented roughly in a V shape relative to the first, extends from a lower roller across the remainder of the inner face of the heater to an upper roller. Each belt contains a solid area as well as one or more elongated windows, which, in the embodiment disclosed, may be staggered relative to one another.

The two separate belts, with independently movable solid and open areas, provide the capability for better control of total air flow rate and final temperature mix than would a single belt wrapped around a single lower roller in a similar V shape. For example, each belt can be set to present the same basic degree of open area to the heat exchanger face that it covers, one fifth open each, one third open each, three quarters open each, etc, and thereby achieve the same basic mixed temperature, but with different total air flow rates. A single belt, wrapped around a common central idler roller into a similar V shape, would require basically an inverse relationship of open and blocked areas, (one fifth-four fifths, one third-two thirds, etc). This is because a single window would be shared across the two heat exchanger faces as the single belt moved. In the invention, mixing of the two air streams is also assisted by the staggered relationship of the two belts' windows, which would also not be possible with a single belt. A single belt wrapping around a central, shared roller would also require a wiping belt seal to prevent air which had passed through the evaporator from leaking directly around the shared roller and in front of the heater, without passing through the heater. But a wiping seal, if forcefil enough to really be effective, would resist free belt movement. Such leakage in the invention is prevented by the fact that the lower heater belt is sheltered on the downstream side of the dividing wall, without the necessity for a belt to pass through an interface between the cold and hot side. The system also has the capability of completely closing off both heat exchanger faces, thereby eliminating the need for a separate external valve door to block off ram air flow through the ventilation system at high vehicle speeds.

BRIEF DESCRIPTION OF THE DRAWINGS

These and other features of the invention will appear from the following written description, and from the drawings, in which.

DESCRIPTION OF THE PREFERRED EMBODIMENT

Figure 1:
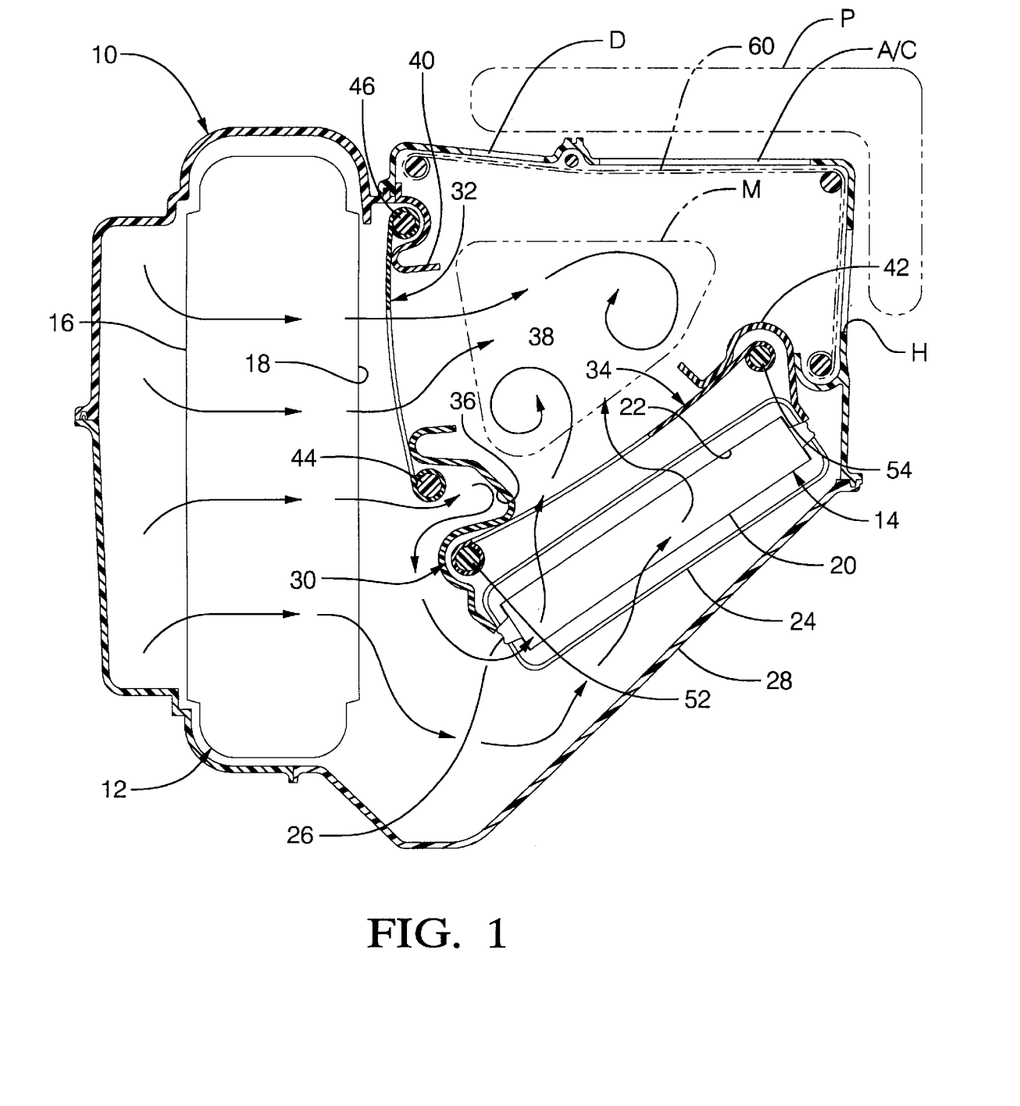
FIG. 1 is a sectional side view of a vehicle HVAC housing incorporating a preferred embodiment of the invention.

Referring first to FIG. 1, an HVAC housing, indicated generally at 10, is a typical, hollow, molded plastic box, more compact than many conventional units, but no untypical in general shape and material. Outside air (or recirculated air, or a combination of the two) is pressurized by a conventional, non illustrated centrifugal blower and forced through housing 10, generally in the direction shown by the arrows, which is covered in more detail below. Ultimately, air exits a selected outlet into a passenger space indicated generally at P (one of three outlets, typically, defrost D, air conditioning A/C, and/or heater H). Before reaching its ultimate destination, however, the air is either cooled, or heated, or, often, both, as determined by a pair of heat exchangers and an air routing structure described in detail below.

Still referring to FIG. 1, housing 10 includes a conventionally sized evaporator, indicated generally at 12, and heater, indicated generally at 14. Both heat exchangers are generally box shaped as well, evaporator 12 having flat outer and inner faces 16 and 18 respectively, and heater 14 having flat outer and inner faces 20 and 22 respectively. The two are arranged in a general V shape within housing 10, with the respective inner faces 18 and 22 facing each other to define what may be referred to as a mixing space M between. Evaporator 12 and heater 14 could be arranged in any relative location that created a mixing space in between the inner faces 18 and 22. Heater 14 is mounted securely within a open mesh frame 24 within housing 10, and a lowermost edge 26 thereof, as well as outer face 20, sit slightly above an upwardly slanted lowermost wall 28 of housing 10. Wall 28 defines what may be termed an air diversion passage extending from the heater lower edge 26 up and under the heater outer face 20. Evaporator 12 is considerably larger than heater 14, enough so to span the entire inner area of housing 10. Consequently, all forced air passes first through evaporator 12, upstream of heater 14. Evaporator 12, may, of course, be activated or not. The air passing evaporator 12, cooled or not, is then routed through the always hot heater 14, or not, to a degree determined by other structure described in detail next.

Figure 2:
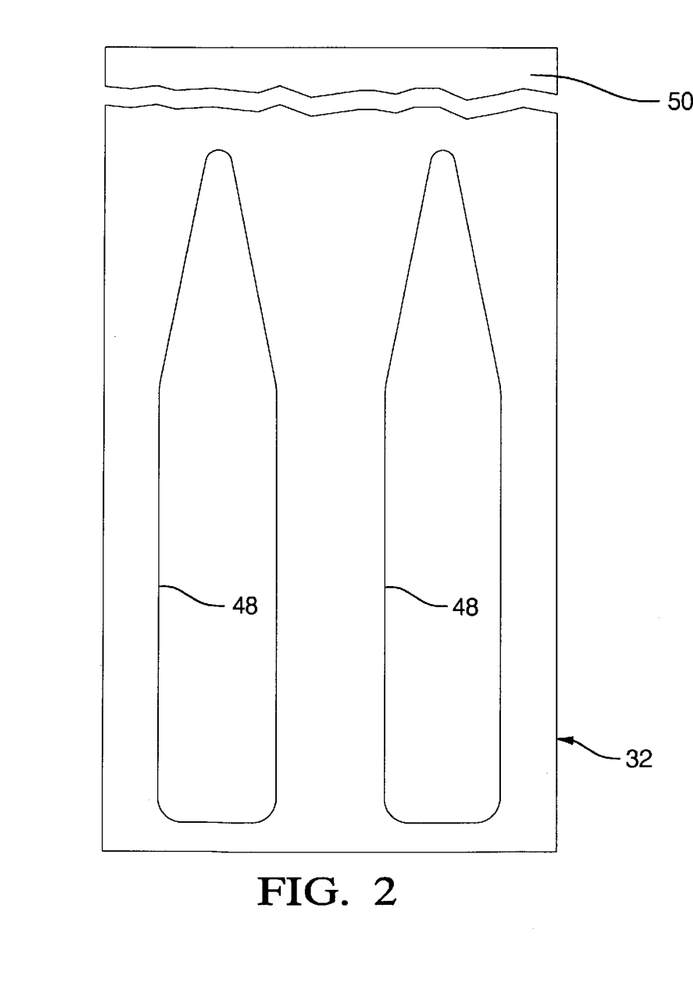
FIG. 2 is a partially broken away flat view of the evaporator belt.

Referring next to FIGS. 1 and 2, the selective routing of air through evaporator 12 and heater 14 is achieved by a central dividing wall 30, and a pair of rolling film belts, a first belt, indicated generally at 32, and second rolling film belt, indicated generally at 34. Dividing wall 30 is, preferably, but not necessarily, a molded plastic piece, and extends with a basic sinuous shape from the heater lower edge 26 up between the heat exchanger opposed inner faces 18 and 22, partially covering both of them. That is, the upstream side 36 of wall 30 faces and covers part of evaporator inner face 18, but by no means all of it, as the downstream side 38 of faces and covers part of heater inner face 22. Above wall 30, a first upper flange 40, in conjunction with wall 30, creates an opening from evaporator inner face 18 into the mixing space M. Likewise, above wall 30, a second upper flange 42, in conjunction with wall 30, creates an opening from heater inner face 22 into mixing space M. First belt 32 rolls back and forth from a lower roller 44 onto, or off of, an upper roller 46 in a run that is located between the evaporator inner face 18 and the dividing wall 30, close to and in abutment with the upstream side 36 thereof. The lower roller 44 is sheltered beneath a bend in the central wall 30, and it is the logical roller to be "live" or powered, by a conventional motor or other actuator, so as to actually wind up or wind out the belt 32. The upper roller 46 sits behind the upper flange 40, and is the more logical roller to be a passive, take up roller, with a take up spring or other bias means to maintain a tension in the belt 32. That roller function could be reversed, of course, or each roller could be actively powered and synchronized with the other to maintain belt tension, but that would be a costly option. First belt 32 is cut with a pair of elongated windows 48 at the bottom, and an equally long solid area 50 at the top. As first belt 32 is rolled back and forth, the windows 48 either register with the opening into the mixing space M, or are wound up completely onto lower roller 44 to leave the opening into the mixing space M completely blocked, or some combination thereof. Air passing through evaporator inner face 18 either enters the mixing space M, or is diverted down along lower housing wall 28, accordingly. The force of air hitting the inside of belt 32 will press it against the dividing wall upstream side 36, providing a seal of sorts, but that seal need not be rigorous. This is because any air that passes through the mid- upper or center area of evaporator inner face 18, and which does not go directly into mixing space M, will impinge on the dividing wall upstream side 36 and be forced down below heater outer face 20. (So, too, for air that passes through the lower part of evaporator inner face 18) Air impinging on the solid dividing wall upstream side 36 will not be able to by pass the heater 14 to leak instead directly in front of the heater inner face 22. Such by pass leakage would prevent the final temperature within the mixing space M from being as hot as it would otherwise be. Such by pass leakage prevention would not be possible if the otherwise solid dividing wall 30 were interrupted by a slot through it that would allow a single, continuous belt to pass through it and in front of heater inner face 22.

Such a slot would have to be covered by a seal wiping on the surface of such a single, continuous belt, which would greatly retard belt motion.

Figure 3:
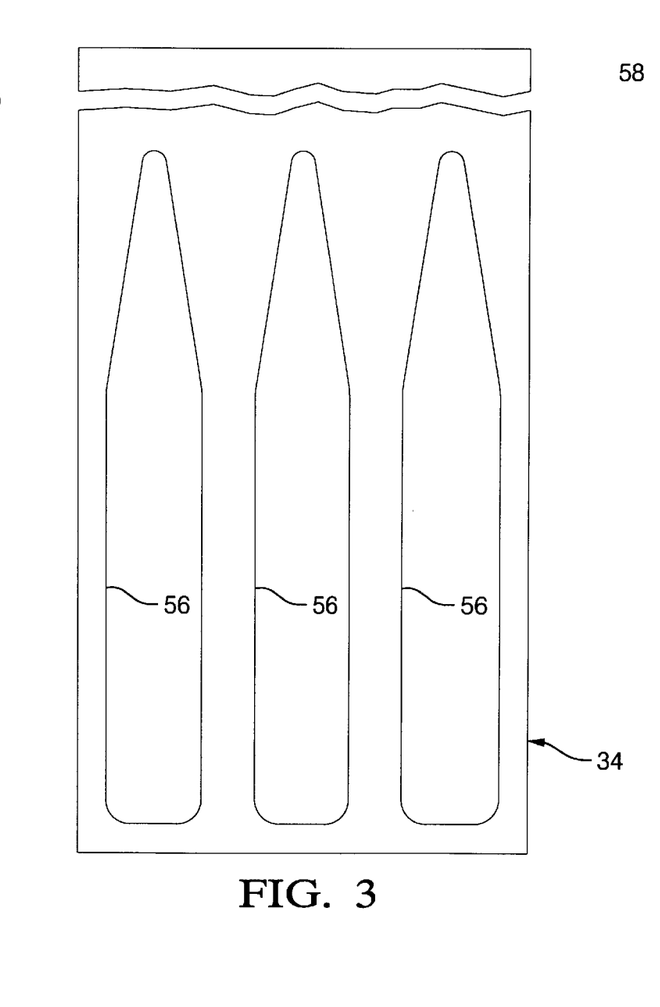
FIG. 3 is a partially broken away flat view of the heater belt.

Referring next to FIGS. 1 and 3, the second, separate belt 34 is of similar material and general configuration to belt 32, winding back and forth between a lower roller 52 and an upper roller 54 in a run that is located between the heater inner face 22 and the dividing wall 30, close to and in abutment with the downstream side 38 thereof. The lower roller 52 is also sheltered beneath a bend in the central dividing wall 30, and is also the logical roller to be powered. This also creates the ability to power the two lower rollers 44 and 52, which are near one another, concurrently and with a single geared actuator, as described in more detail below. The upper roller 54 sits beneath the upper flange 42, and is also the more logical roller to be a passive, take up roller. Second belt 34 is cut with three, narrower elongated windows 56 at the bottom, and an equally long solid area 58 at the top. As second belt 34 is rolled back and forth, the windows 56 either register with the opening into the mixing space M, or are wound up completely onto lower roller 52 to leave the opening into the mixing space M completely blocked, or some combination thereof. Air flowing up from above wall 28 and through heater 14 forces belt 34 against the dividing wall downstream side 38 and exits the windows 56. The air tempered by flowing through heater 14 is also blocked from flowing back in front of the evaporator inner face 18 by the solid dividing wall 30.

Figure 4:
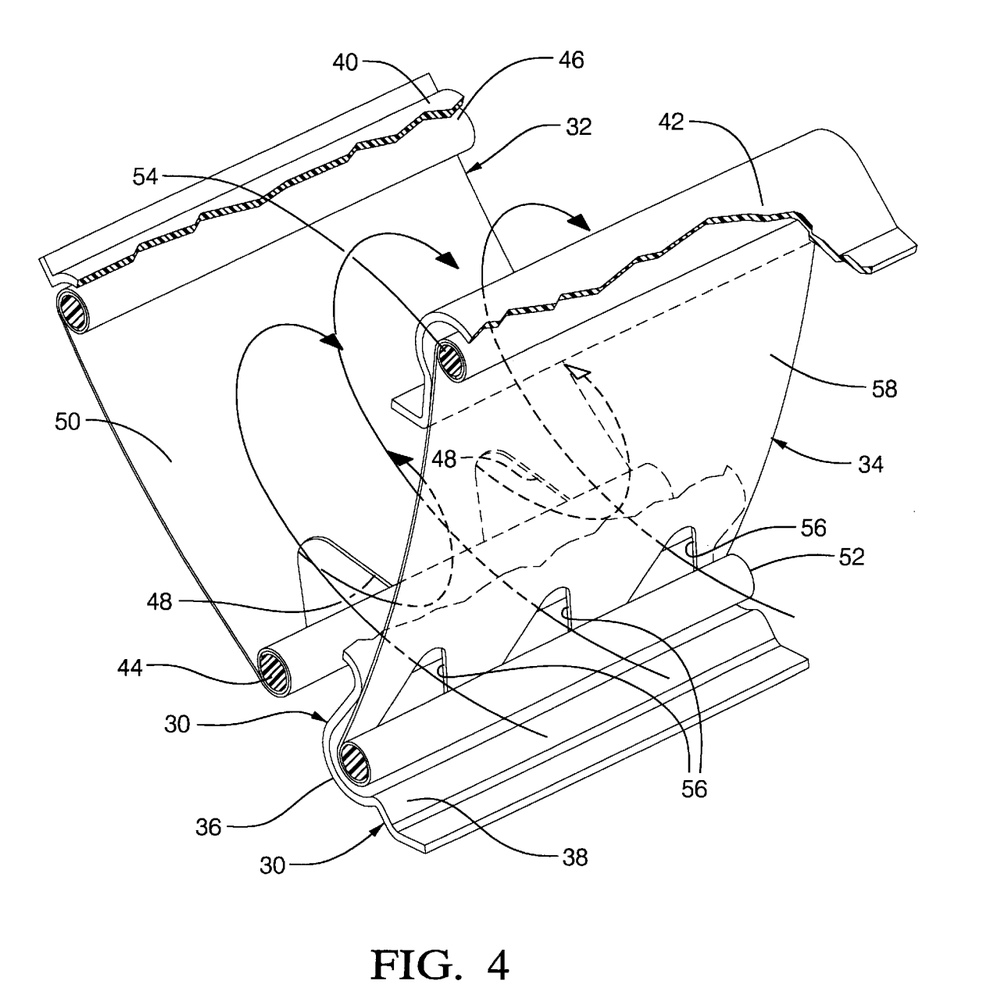
FIG. 4 is a perspective view of the two belts alone moved to a mid temperature setting, at a low total flow rate.

Referring next to FIG. 4, one of the temperature and air flow combinations possible is illustrated. Central dividing wall is partially broken away to give a better view of the belts 32 and 34, as are the upper flanges 40 and 42. Both belts 32 and 34 are moved so as to put small, and roughly equal lengths of their respective windows 48 and 56 in registration with the respective heat exchanger inner faces 18 and 22. Most of the potential air flow area is blocked by the belt solid areas 50 and 58, but the air streams that are allowed through are enough to create a total air flow into the mixing space M of approximately 50 cubic feet per minute, and at a final, mixed temperature of approximately 65 degrees F. Mixing of the hot and cold air streams to a final temperature is assisted by the staggered relationship of the windows 48 and 56, which creates a swirling action. From the mixing area M, of course, tempered air can be admitted to the passenger P through any or all of the outlets D, A/C or H, as determined by any suitable valve or belt type mode control device, such as a mode belt indicated generally at the dotted line 60. Were the two belts 32 and 34 not in fact separate, but, instead, two legs of a single belt wrapped around a single, common idler roller at the bottom of the V, this combination of temperature and air flow would not be possible. With such a single belt, the belt windows would be forced into an inverse relationship across the two legs of the V, for example, ⅓ on one side, and ⅔ on the other. Moreover, an unslotted, solid dividing wall like 30 would not be available, or even possible, to prevent air that had passed through evaporator 12 from leaking over and in front of heater inner face 22, instead of being forced through heater 14. That kind of by pass leakage would interfere with attaining the kind of mid range final temperature that equal belt openings could otherwise attain.

Figure 5:
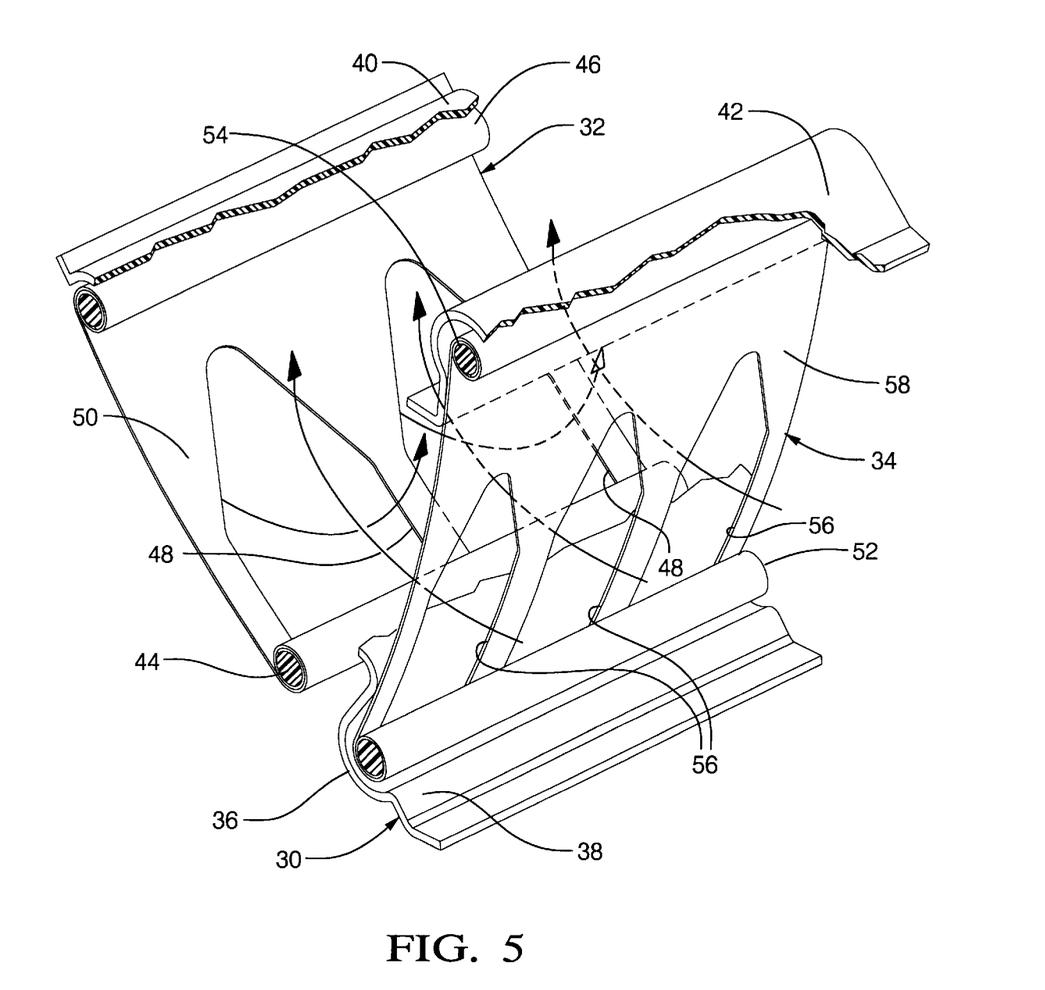
FIG. 5 is a view similar to FIG. 4, showing the belts at the same mid temperature setting, but with a higher total flow rate.

Referring next to FIG. 5, another possible air flow and temperature combination is illustrated. Here, more total length and area of the espective belt windows 48 and 56 has been rolled into an open position, but till in roughly equal proportion. Again, this is not a combination of open areas, or even a total open area, that would be possible with a single belt. Now, total air flow into the mixing space M is greater, approximately 100 cubic feet per minute, the final temperature, determined by the by the substantial equality of open areas, is still 65 degrees F.

Figure 6:
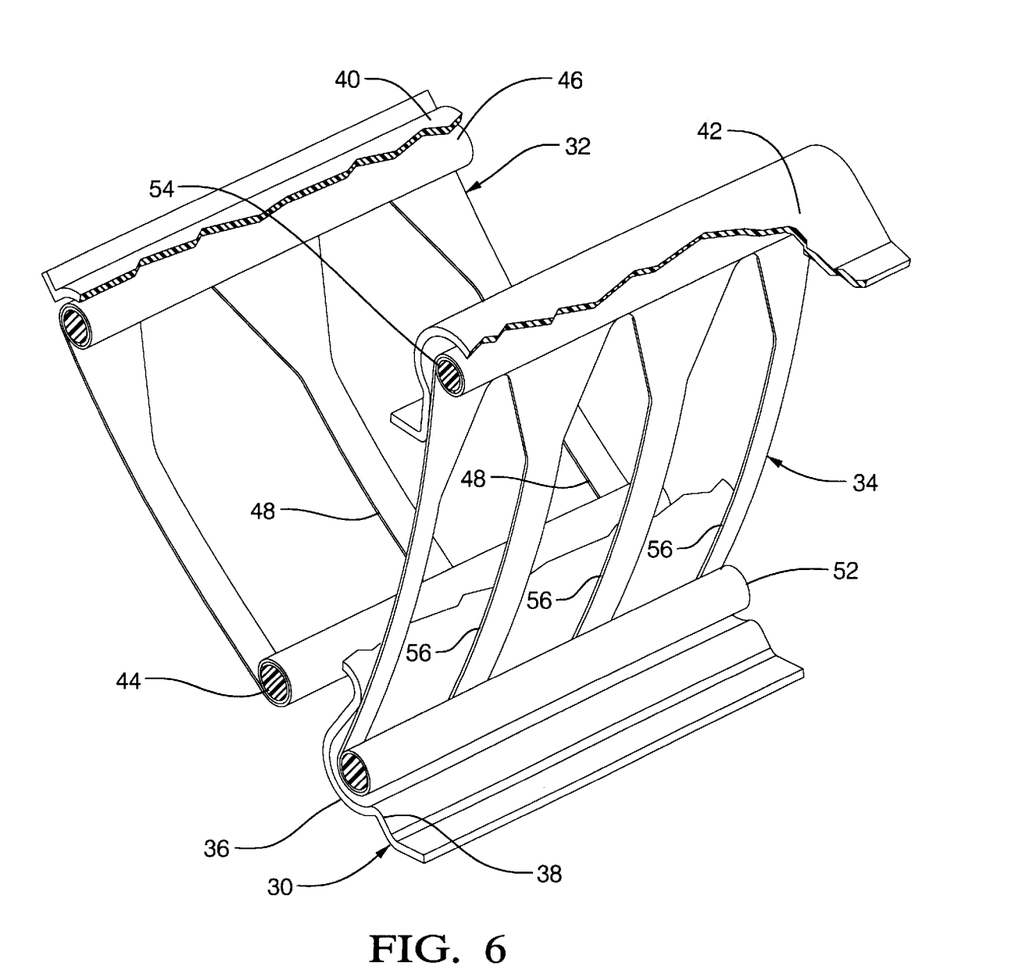
FIG. 6 is a view similar to FIG. 5, showing the belts again at the same mid temperature setting, but at an even higher total flow rate.

Referring next to FIG. 6, yet another possible air flow and temperature combination is illustrated. Now, essentially all of the total length and area of the respective belt windows 48 and 56 has been rolled into an open position, and still in roughly equal proportion. As before, neither this combination of open areas, nor certainly not this large a total open area, would be possible with a single belt that was forced to share a single window across two adjacent runs of the single belt. Here, the total air flow rate can be very high, approximately, 200 cubic feet per minute, while the temperature remains at around 65 degrees F. The invention can do a great deal more than simply maintain a given temperature over a range of air flow rates, as will be described next.

Figure 7:
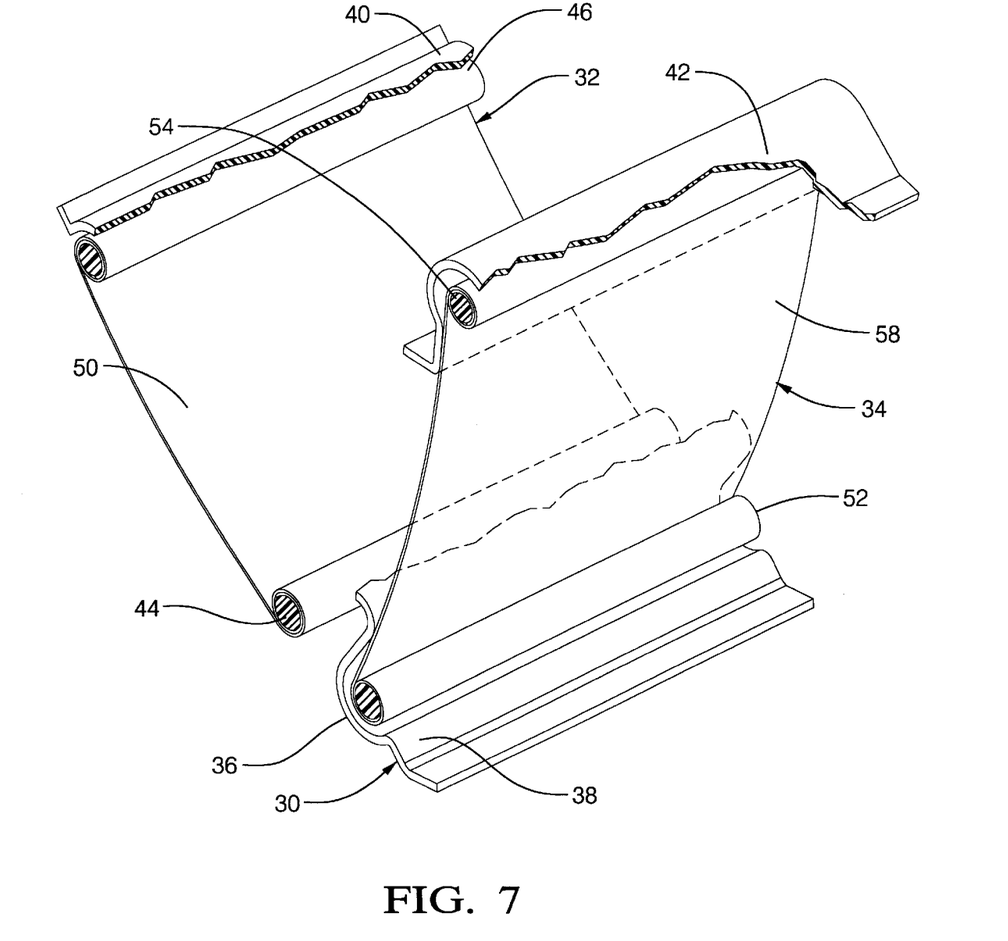
FIG. 7 is a view similar to FIG. 4, but showing both belts rolled to a solid position, blocking all air flow.

Referring next to FIG. 7, the two belts 32 and 34 are shown rolled down onto the respective lower rollers 44 and 52 to the point where only respective belt solid areas 50 and 58 are exposed. Consequently, air passing through both the evaporator 12 and heater 14 will be blocked from entering the mixing area M, or from reaching any of the outlets D, A/C or H. This belt position provides a great advantage when the vehicle is moving at high speed, in that it prevents ram air from being forced into the passenger space P, without the need for a separate, external shut off valve upstream of the heat exchangers 12 and 14. Air forcibly impinging on the belts 32 and 34 simply pushes the respective belt solid areas 50 and 58 more strongly into the dividing wall's upstream and downstream sides 36 and 38, assisting in the sealing action, and eventually creating a pressure dead head that prevents outside air from ramming into the housing 10. Elimination of a ram air control valve represents a considerable potential saving.

Figure 8:
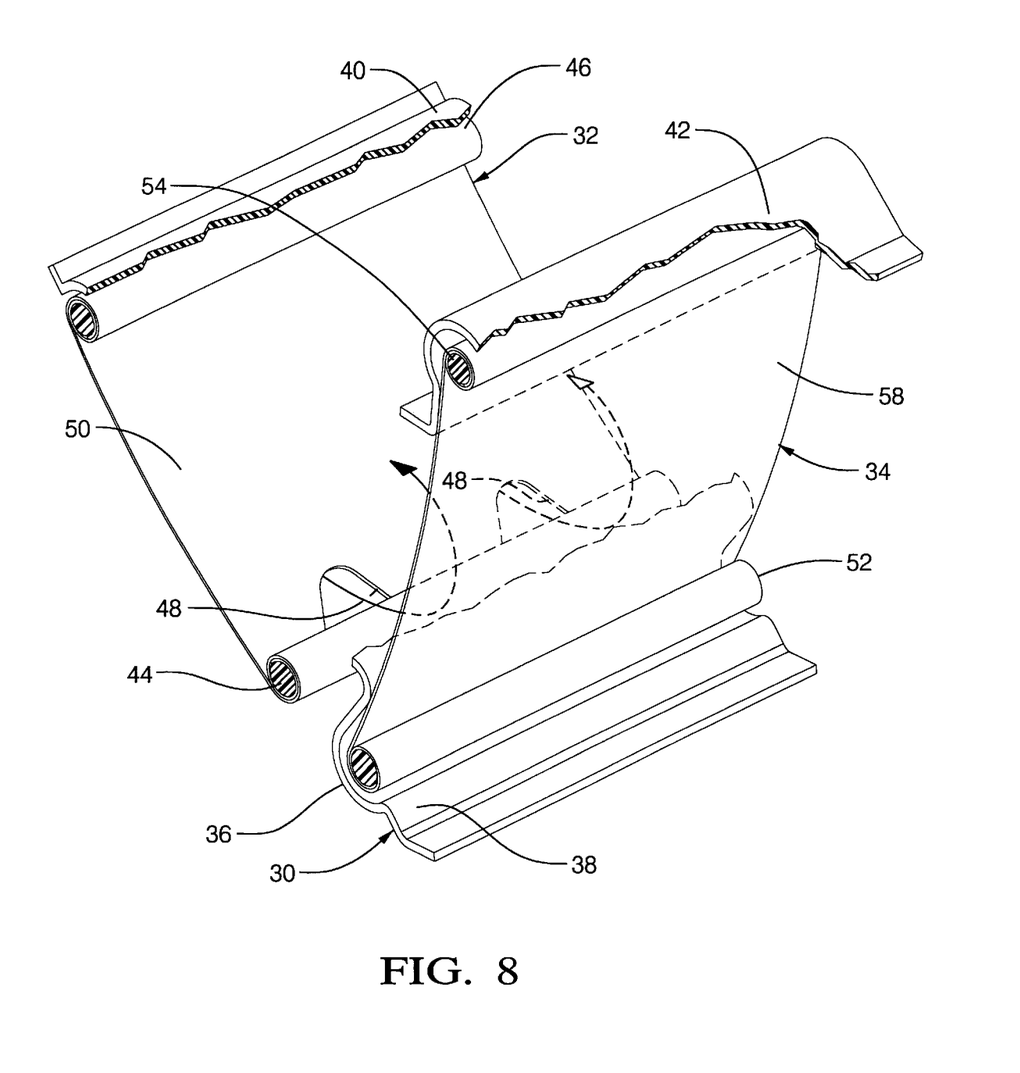
FIG. 8 is a view similar to FIG. 7, but showing only the vaporator belt open, and only to a small degree.
Figure 9:
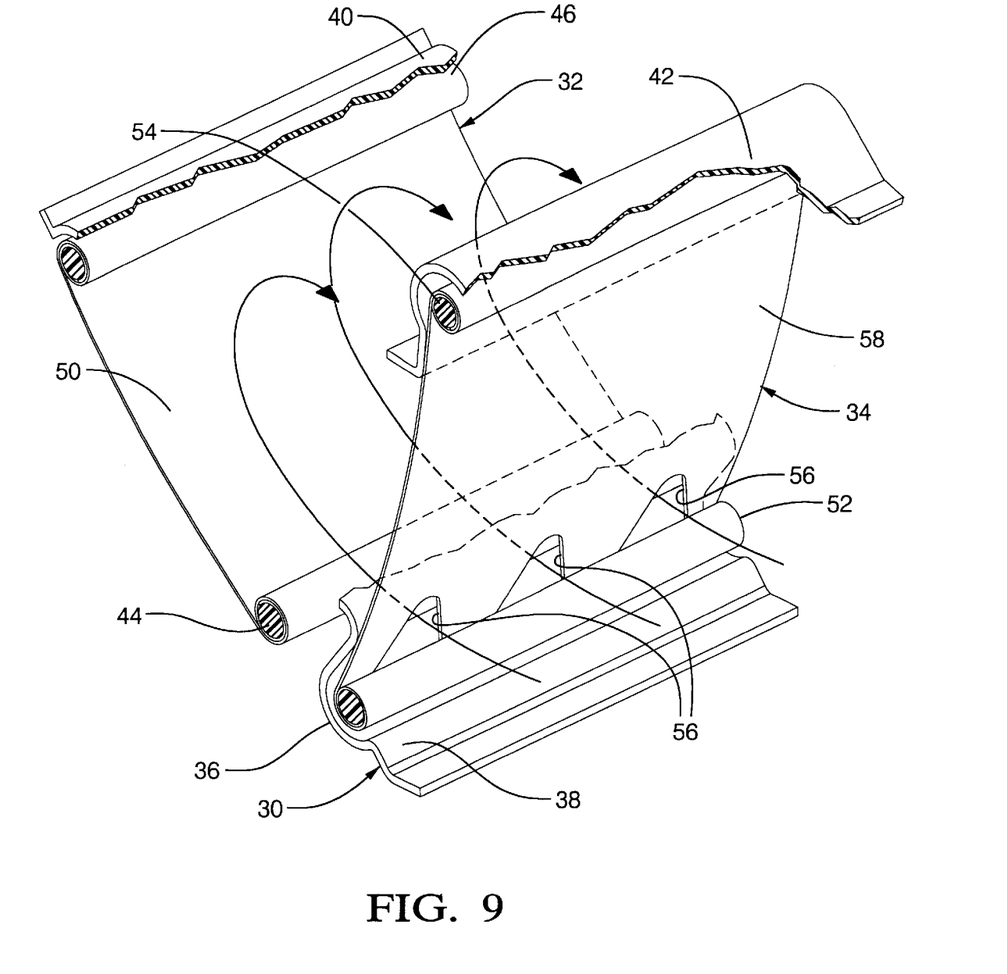
FIG. 9 is a view similar to FIG. 8, but showing only the eater belt open, to a moderate degree.

Referring next to FIGS. 8 and 9, two other of many possible belt positions are illustrated. Evaporator belt 32 is moved to expose only a small area of its windows 48, while the heater belt 34 completely blocks heater 14. This would allow a very low flow rate of air that was not tempered by the heater 14, be it ambient temperature air, or air that has been cooled by an active evaporator 12. FIG. 9 shows essentially the converse. The evaporator 12 is completely blocked by belt 32, while the windows 56 of heater belt 34 are open to a moderate degree. This would provide air warmer than that resulting from the positions illustrated in FIGS. 4–6 above, but at a much lower total flow rate. With totally independently powered and individually movable belts 32 and 34, an essentially limitless possible combinations of temperature and flow rate could be achieved.

Variations in the disclosed embodiment could be made. For example, while still keeping the two belts 32 and 34 individual and separate, they could be moved in tandem by a single actuator geared to each lower roller 44 and 52. Although doing so would eliminate many possible combinations of belt openings, many would still be possible. For example, all of the positions shown in FIGS. 4 through 7 would still be possible, while saving the expense of a second actuator. The belt windows 48 and 56 need not be staggered, as shown, although doing so is cost free and promotes a swirling and mixing action that would not be possible with a single belt. Or, the windows 48 and 56 could be shaped very differently, for example, slanted in opposing directions, so as to promote air mixing even more vigorously. Again, differing shapes, locations, and sizes of belt windows would not be possible with a single belt. The separate belts 32 and 34 could instead be arranged as multiple separate, adjacent pairs (or threes, or fours) of belts facing each heat exchanger 12 and 14, with zone walls dividing the mixing space M into an equivalent number of separate temperature zones, one zone for each pair of belts. One wall would create two zones, two would yield three, and so on. Then, the pair of belts located in each zone (regardless of the number of zones) could be moved just as the single pair of belts in the single zone were described as moving above. This presumes, of course, a suitable means to actuate the adjacent multiple pairs of belts. But, because the pair of belts in each zone would be separate, each zone could have its own temperature controlled as described above. And, because of the fact that the cold and hot air are routed into the mixing zone M as described above, with the cooperation of the solid dividing wall 30 and the diversion passage below the heater 14, it would only be necessary that the zone walls engage the inner surfaces of the belt pairs to create good temperature division, with no so called "cross talk" between individual zones. The zone walls would not, as in a conventional zoned system, have to extend all the way in to the faces of the heat exchangers to create a good zone division.

What is claimed is:

1. A vehicle heating, ventilation and air conditioning system with a housing that has an evaporator through which substantially all of a forced air stream is directed and a heater located downstream of said evaporator through which air can be selectively directed after having passed through the evaporator, said evaporator and heater having outer faces directed away from one another and inner faces generally opposed to one another and defining an air mixing space between their respective inner faces, characterized by, an air flow diversion passage extending from the lower edge of said heater inner face around to the outer face of said heater, so that at least a portion of the forced air that has passed through said evaporator can be diverted around to flow completely through said heater and into said air mixing space, a solid dividing wall located between said opposed heater and evaporator inner faces with an upstream side facing said evaporator inner face and a downstream side facing said heater inner face, said dividing wall also being sealed against the lower edge of said heater inner face so as to block a portion of said opposed evaporator and heater inner faces from one another and so as to direct any air passing through the evaporator and impinging on the upstream side into said diversion passage, a rolling evaporator belt located between said evaporator inner face and the upstream side of said dividing wall and extending from said dividing wall across the remaining portion of said evaporator inner face, said evaporator belt having at least one window therein to allow said evaporator inner face to be blocked or unblocked to any desired degree, in conjunction with said dividing wall, and, a rolling heater belt separate from said evaporator belt, located between said heater inner face and said dividing wall downstream side, and extending from said dividing wall across the remaining portion of said heater inner face, said heater belt having a least one window therein to allow said heater face to be blocked or unblocked to an any desired degree, in conjunction with said dividing wall, whereby forced air that has passed through said evaporator flows either directly into said mixing space, or along said solid dividing wall upstream side and into said diversion passage, but is prevented by said solid dividing wall from leaking directly in front of said heater inner face without passing through said heater.

2. A vehicle heating, ventilation and air conditioning system according to claim 1, further characterized in that each of said belts is independently actuated to block or unblock said evaporator and heater inner faces.

3. A vehicle heating, ventilation and air conditioning system according to claim 1, further characterized in that the window in each of said belts is staggered relative to the window in the other belt.

* * * * *